(12) United States Patent
Yurdana et al.

(10) Patent No.: US 11,807,273 B2
(45) Date of Patent: *Nov. 7, 2023

(54) METHODS AND APPARATUS TO PROVIDE ACCIDENT AVOIDANCE INFORMATION TO PASSENGERS OF AUTONOMOUS VEHICLES

(71) Applicant: Mobileye Vision Technologies Ltd., Jerusalem (IL)

(72) Inventors: Matt Yurdana, Portland, OR (US); John Weast, Portland, OR (US); Ignacio Alvarez, Portland, OR (US)

(73) Assignee: Mobileye Vision Technoloties Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,792

(22) Filed: Sep. 19, 2022

(65) Prior Publication Data

US 2023/0076098 A1  Mar. 9, 2023

Related U.S. Application Data

(63) Continuation of application No. 16/888,823, filed on May 31, 2020, now Pat. No. 11,472,440.

(60) Provisional application No. 62/907,181, filed on Sep. 27, 2019.

(51) Int. Cl.
*B60W 60/00* (2020.01)
*B60W 30/08* (2012.01)
*B60W 50/16* (2020.01)
*B60W 50/14* (2020.01)

(52) U.S. Cl.
CPC ........ *B60W 60/0016* (2020.02); *B60W 30/08* (2013.01); *B60W 50/16* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 8,676,431 B1 * | 3/2014 | Mariet | B60T 7/22 701/28 |
| 10,564,638 B1 * | 2/2020 | Lockwood | G05D 1/00 |
| 2015/0314783 A1 * | 11/2015 | Nespolo | B60W 30/095 701/301 |
| 2019/0256083 A1 * | 8/2019 | Kang | B60W 30/09 |

(Continued)

*Primary Examiner* — James J Lee
*Assistant Examiner* — Andrew Sang Kim
(74) *Attorney, Agent, or Firm* — FINNEGAN, HENDERSON, FARABOW, GARRETT & DUNNER LLP

(57) ABSTRACT

Methods and apparatus to provide accident avoidance information to passengers of autonomous vehicles are disclosed. An example apparatus includes a safety analyzer to determine an autonomously controlled vehicle is in a safe situation at a first point in time and in a dangerous situation at a second point in time. The example apparatus also includes a user interface generator to: generate user interface data to define content for a user interface to be displayed via a screen, the user interface to include a graphical representation of the vehicle, the user interface to graphically indicate the vehicle is in the safe situation at the first point in time; and modify the user interface data so that the user interface graphically indicates the vehicle is in the dangerous situation at the second point in time.

20 Claims, 8 Drawing Sheets

(56) References Cited

U.S. PATENT DOCUMENTS

2019/0310636 A1* 10/2019 Halder ................. G05D 1/0274
2020/0412811 A1* 12/2020 Campbell ............ G05D 1/0221

* cited by examiner

METHODS AND APPARATUS TO PROVIDE ACCIDENT AVOIDANCE INFORMATION TO PASSENGERS OF AUTONOMOUS VEHICLES

RELATED APPLICATIONS

This patent arises from a continuation of U.S. patent application Ser. No. 16/888,823, which was filed on May 31, 2020, and which claims priority to U.S. Provisional Patent Application No. 62/907,181, which was filed on Sep. 27, 2019. Priority to U.S. patent application Ser. No. 16/888,823, and U.S. Provisional Patent Application No. 62/907,181 is claimed. U.S. patent application Ser. No. 16/888,823, and U.S. Provisional Patent Application No. 62/907,181 are incorporated herein by reference in their entireties.

FIELD OF THE DISCLOSURE

This disclosure relates generally to autonomous vehicles, and, more particularly, to methods and apparatus to provide accident avoidance information to passengers of autonomous vehicles.

BACKGROUND

Technology has advanced considerably in recent years in the field of autonomously controlled vehicles. A fully autonomous vehicle is now capable of controlling all operations of the vehicle to safely navigate from one location to another without any input from a human.

Figure 1:
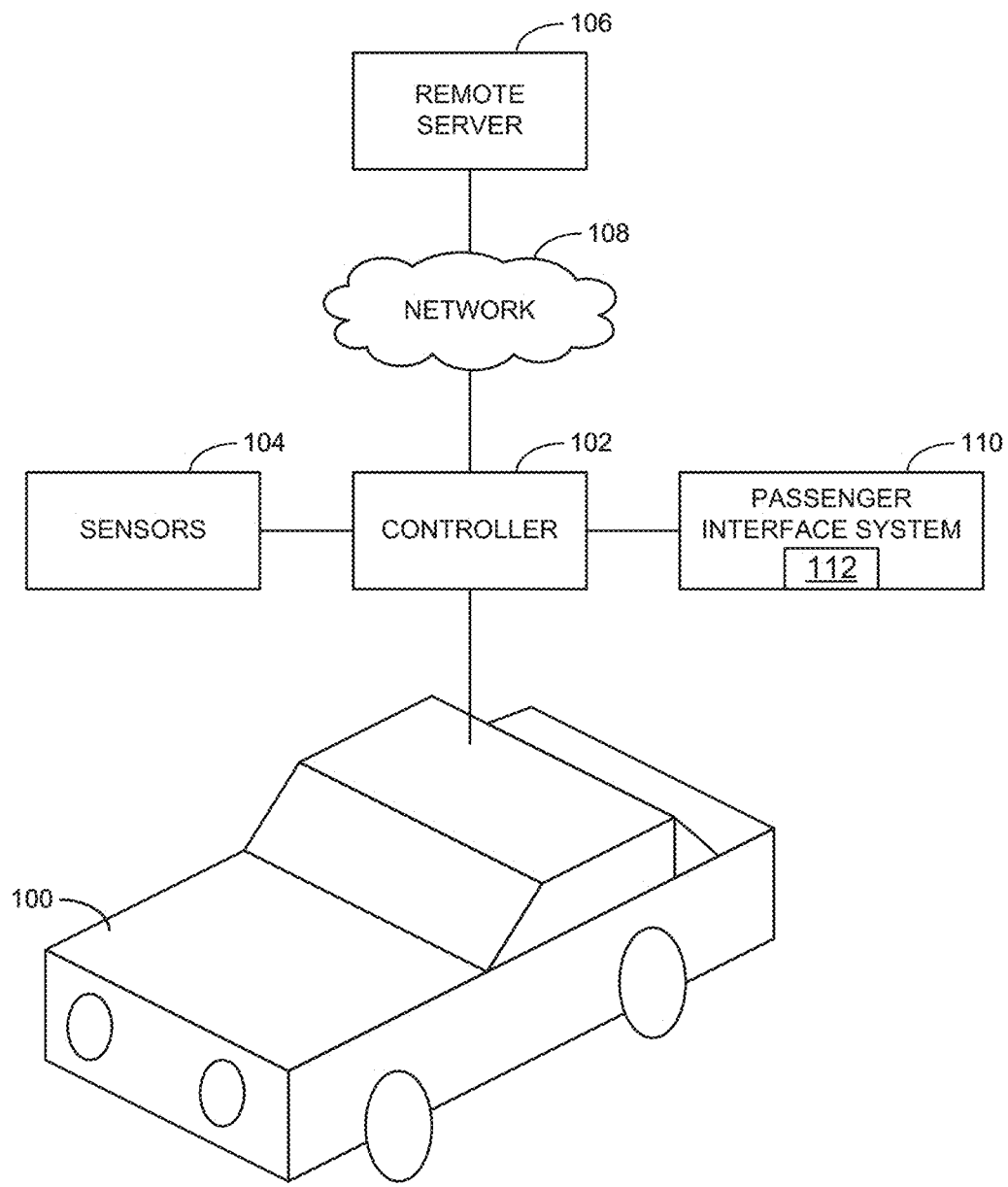
FIG. 1 is a schematic illustration of an example autonomous vehicle implementing an example controller in accordance with teachings disclosed herein.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Fully autonomous vehicles have been shown to safely navigate on roads without human intervention based on feedback from a plurality of sensors on the vehicles monitoring the surrounding environment in conjunction with a navigation system (e.g., a global positioning system). However, research has shown that many people remain apprehensive about the ability of such vehicles and may experience some level of anxiety when sitting as a passenger inside an autonomously controlled vehicle. Some autonomously controlled vehicles include one or more human machine interfaces (e.g., display screen(s)) that provide information indicating the autonomous control system's operational status. Such in-vehicle displays screens are sometimes referred to as "confidence screens" because they are intended to instill confidence in passenger(s) that the vehicle is aware of the surrounding environment and fully capable of navigate therethrough.

Often the information provided on a confidence screen includes a graphical representation of the autonomous vehicle in which the passenger is riding (commonly referred to as the ego vehicle) as well as a graphical representation of the surrounding environment. As used herein, a graphical representation includes any type of visual representation such as, for example, a photo-realistic representation, a virtual representation, generic and/or abstract icons, etc. Typically, the representation of the surrounding environment includes some or all aspects of the real world detected by the autonomous control system of the ego vehicle. For instance, the display may provide a graphical representation of detected stationary objects (e.g., road signs, traffic lights, lines on roads, curbs, traffic medians, sidewalks, lamp posts, trees, buildings, road construction workers and/or equipment, stationary hazards (e.g., potholes, disabled vehicles, stationary debris, etc.), detected moving objects (e.g., other vehicles, pedestrians, cyclists, road construction workers and/or equipment, moving hazards (e.g., moving debris, etc.), as well as map-based navigation details (e.g., roads, lane divisions, onramps, offramps, intersections, an intended route to be followed, etc.). The graphical representation may be relatively realistic (e.g., show the shapes of detected cars, pedestrians, and other detected objects) or abstract (e.g., provide boxes and/or other basic geometric shapes in place of real-world objects). Graphically representing such information on a confidence screen enables passenger(s) to quickly compare what is on the screen to what they see out the vehicle's windows to confirm that the autonomous vehicle is aware of all pertinent information to safely navigate through the surrounding environment.

In addition to providing a graphical representation of the surrounding environment and the relationship of the autonomous vehicle within that environment, confidence screens may also provide information about the operation of the vehicle. For example, confidence screens may provide graphical and/or textual information indicating the direction of travel, the speed of travel, a distance travelled, gas tank levels, a current acceleration of the vehicle, the angle of wheels/steering wheel, activation of turn signals, etc. Further still, in some examples, the confidence screen may provide explanations of why certain operations are taking place. For example, if a pedestrian is crossing the street at an intersection where the autonomous vehicle intends to turn, the confidence screen may include the text, "Yielding to pedestrian," to explain why the vehicle has stopped at the intersection. The confidence screen may also provide details about future operations based on the intended navigation route to be followed. For example, the confidence screen may include the text, "Turning right in 300 yards," to explain the upcoming operation of a righthand turn.

While confidence screens in autonomous vehicles may provide some or all of the above aspects of the vehicles' real-time awareness of the surrounding environment (e.g., proximity of other nearby vehicles) and current planning state (e.g., next planned turn in route to destination), existing confidence screens do not provide real-time explanations of dangerous situations detected by the autonomous vehicle and the subsequent actions taken by the vehicle to avoid the dangerous situations. Furthermore, a disadvantage of limiting information represented on a confidence screen to what an autonomous vehicle is doing in the moment (e.g., in substantially real-time) is that such information does not convey how the vehicle is proactively keeping passenger(s) safe, what the vehicle is capable of doing to keep passenger(s) safe, or why an autonomous vehicle takes certain actions in a complex and/or dangerous driving situation. As a result, this leaves passenger(s) wondering what the vehicle might do in any given moment during a trip, thereby increasing the anxiety and/or apprehensiveness of passenger(s) while in an autonomous vehicle. Examples disclosed herein provide substantially real-time (e.g., less than 1 second delay) notifications of dangerous situations detected by an autonomous vehicle on a confidence screen in a manner that can be quickly and easily understood by a passenger. Additionally or alternatively, examples disclosed herein provide advanced notifications of anticipated future dangerous situations. As used herein, a dangerous situation is defined to mean a situation that may be deterministically determined to violate one or more mathematically defined safe driving rules associated with a safety model implemented by the autonomous vehicle. The safety model may define multiple safe driving rules. As such, if any one of these rules is violated (e.g., threshold speeds, distances, accelerations, and/or other parameters are satisfied in view of particular conditions defined by the safe driving rules), the autonomous vehicle is, by definition, in a dangerous situation. On the other hand, if the current circumstances of the vehicle are such that all of the deterministically analyzed safe driving rules are being met, the vehicle is not in a dangerous situation (e.g., a safe or non-dangerous situation). Examples disclosed herein provide graphical representations via a confidence screen that intuitively convey when an autonomous vehicle has detected a dangerous situation and how the vehicle responds to the situation (e.g., through evasive action(s) such as forceful braking, veering to the left or right, etc.) and/or other action(s). As a result, passenger(s) are able to understand what the vehicle is doing and why, in any moment, to put their mind at greater ease about the abilities of the vehicle.

Research has shown that passenger(s) in an autonomous vehicle do not typically spend their time watching the confidence screen but instead look out the windows at the real world and/or engage in some other activity (e.g., use a phone or other portable device, sleep, talk to other passenger(s), etc.). As such, providing substantially real-time contextual information about dangerous situations (alternatively referred to herein as danger risks or risk situations for short) and the resulting safety actions implemented by the vehicle may not be perceived by passenger(s). That is, in some examples, passenger(s) may not be looking at the confidence screen or paying attention to the road and, therefore, may not be aware of a dangerous situation until they feel the effects of the brakes being forcefully applied or the vehicle suddenly swerving to the left or right. Such sudden and unexpected movements are likely to cause anxiety in passenger(s) and questions about what the autonomous vehicle is doing. In some examples, lights and/or sounds may be triggered as soon as the dangerous situation is detected to alert the passenger(s). However, such alerts may give only a moment's notice before the vehicle implements a sudden evasive action to keep the passenger(s) safe. This may not be adequate time for a person to assess the situation by looking out the windows or referring to the confidence screen. Furthermore, if the dangerous situation is only represented in substantially real-time, the event may have already passed when the passenger(s) become sufficiently aware of their situation such that they will be unable to come to an understanding of what happened by referencing the confidence screen. Furthermore, the dangerous situation may not be apparent to the passenger(s) looking out the windows after the fact. In such circumstances, the anxiety of the passenger(s) may continue after the experience because they have no way of easily assuring themselves that the autonomous vehicle was acting in a manner consistent with safe driving expectations. In fact, they may be left with a contrary impression. Accordingly, in some examples, a confidence screen may automatically replay a graphical representation of a detected dangerous situation and corresponding response one or more times after the event has occurred to give passenger(s) an opportunity to review what occurred and satisfy themselves that the vehicle responded to the situation in a suitable manner. Not only will this enable passenger(s) to put their minds at ease following a sudden and unexpected action in the car, this may also increase the overall confidence of passenger(s) in the ability of autonomous vehicles to handle other dangerous situations that may arise unexpectedly.

Unlike humans, autonomous vehicles identify and respond to dangerous situations based on complex safety models defined by particular mathematical principles and formal logic of accident avoidance. In some examples, the particular mathematically defined rules that govern safety actions taken by an autonomous vehicle are based on the Responsibility Sensitive Safety (RSS) model developed by MOBILEYE®, an INTEL® company. Other models may also be used. A typical passenger is unlikely to be able to understand and/or be interested in applying the effort necessary to understand the complex mathematics associated with the safety models implemented by autonomous vehicles. Accordingly, in some examples, the complex decision-making of an autonomous vehicle is represented on a confidence screen using intuitive graphics that can be quickly and easily understood by a typical passenger FIG. 1 is a schematic illustration of an example autonomous vehicle 100 implementing an example controller 102 in accordance with teachings disclosed herein. In this example, the vehicle 100 is capable of being fully autonomous. As used herein, a fully autonomous vehicle is defined to be a vehicle that is able to control the operations of the vehicle to navigate the vehicle to a destination without human intervention. In this example, fully autonomous operations of the vehicle 100 are controlled by the controller 102. While capable of operating without human intervention, a fully autonomous vehicle may nevertheless still receive inputs from a human (e.g., a driver or other passenger) that impact the way in which the vehicle is controlled and/or particular operations are implemented. Further, although capable of being fully autonomous, in some examples, the autonomous vehicle 100 may also be capable of operating in a semi-autonomous and/or non-autonomous manner where some or all of the operations of the vehicle are dependent on human intervention. Further, although the vehicle shown in FIG. 1 is a passenger automobile, any other type of vehicle (e.g., a truck, an airplane, a bus, a boat, etc.) may be employed.

In the illustrated example, the controller 102 is communicatively coupled to sensors 104. The sensors 104 provide inputs to the controller 102 to enable the controller 102 to make decisions in how to control the vehicle and navigate through the surrounding environment in a safe manner. In some examples, the sensors 104 include sensors used in systems of the autonomous vehicle 100. For example, the sensors 104 may include wheel speed sensors, ride height sensors, steering wheel sensors and/or wheel angle sensors, temperature sensors, seat occupancy sensors, etc. Additionally or alternatively, in some examples, the sensors 104 include sensors to detect circumstances of the environment surrounding the autonomous vehicle 100. For example, the sensors 104 may include visible light cameras, infrared cameras, radar sensors, LiDAR sensors, ultrasonic sensors, etc. Further, in some examples, the sensors include sensors to detect the location, position, and movement of the autonomous vehicle 100. For example, the sensors 104 may include inertial measurement units, accelerometers, gyroscopes, magnetometers, global positioning system (GPS) sensors, etc.

In the illustrated example of FIG. 1, the controller 102 is communicatively coupled to a remote server 106 via a network 108. In some examples, the remote server 106 provides information to assist the controller 102 to navigate the vehicle 100. For instance, the remote server 106 may provide maps, route information, current traffic conditions, etc. Additionally or alternatively, in some examples, the remote server 106 collects information from the controller 102 regarding the vehicle's operations, navigation, and/or surrounding environment. In some examples, the remote server 106 is in communication with multiple vehicles. In some such examples, the controller 102 of the vehicle 100 may communicate with other vehicles via the remote server 106. In other examples, the controller 102 may communicate with other nearby vehicles directly (e.g., via the network 108 and/or via short range radio communications) to obtain and/or provide additional details about the environment surrounding the vehicle 100.

In the illustrated example of FIG. 1, the controller 102 is communicatively coupled to a passenger interface system 110. In some examples, the passenger interface system 110 includes a display screen 112 to provide alerts, notifications, and/or other information to passenger(s) within the vehicle. More particularly, in some examples, the display screen 112 serves as a confidence screen, as described above, to provide information to passenger(s) within the vehicle 100 about the abilities and/or operations of the vehicle to keep the passenger(s) safe. In some examples, the passenger interface system 110 includes a speaker 114 to provide audible alerts, notifications, messages, and/or information to the passenger(s). In some examples, the passenger interface system 110 includes multiple displays screens 112 and/or multiple speakers 114 positioned at different locations within the vehicle 100 (e.g., in the front and back and/or on the left and right). In some such examples, the different screens display the same information. In other examples, the different screens may provide different information. In some examples, the information rendered via the display screen(s) 112 and/or output by the speaker(s) 114 is generated and/or provided by the controller 102 including, for example, the direction of travel, speed, intended path, etc. of the other vehicles near the vehicle 100 (e.g., vehicles approaching an intersection, merging via an on-ramp, etc.).

In some examples, the passenger interface system 110 is incorporated and/or built into the vehicle 100. For example, the display screen(s) 112 (and associated speakers and/or other related components) may be in a front console of the vehicle, may be a dropdown display fixed to the ceiling of the vehicle, and/or may be installed in the backside of one or more of the seats in the vehicle (e.g., to be viewable by passengers located behind such seats). In other examples, the passenger interface system 110 is physically independent and/or separate from the vehicle 100 but in communication therewith. For example, some or all of the functionality of the passenger interface system 110 may be implemented by a smartphone or other portable computing device (e.g., a laptop, a tablet, etc.) that may be removed from the vehicle 100 and/or carried by a passenger. In some such examples, the controller 102 communicates with the passenger interface system 110 using any suitable wireless communication technology (e.g., Wi-Fi, Bluetooth, etc.). In some examples, the passenger interface system 110 includes both display screens 112 that are integrated and/or built into the vehicle 100 and display screens 112 associated with portable electronic devices that may be carried by the passengers. In some examples, a passenger may toggle between using the integrated display screen(s) 112 and the portable display screen(s) 112 and/or use both types of display screens 112 concurrently. In some examples, the controller 102 may provide information for display on a display screen that is remotely located from the vehicle 100 (e.g., a display screen associated with the remote server 106 and/or another computing device in communication with the controller 102 via the network 108).

In some examples, the passenger interface system 110 includes means to receive inputs from the passenger(s). For instance, in some examples, the display screen 112 is a touch screen to enable passenger(s) to interact with the content rendered on the screen. Additionally or alternatively, the passenger interface system 110 includes a keyboard, buttons, dials, etc. to enable passenger(s) to provide inputs to the vehicle. Further, in some examples, the passenger interface system 110 includes a microphone to receive voice commands from the passenger(s). In some examples, the passenger inputs are provided to the controller 102 to control the operation of the vehicle. In some examples, the passenger inputs enable the passenger(s) to control the content rendered via the display screen 112 (e.g., to request particular information to be rendered).

Many different types of information may be represented on the display screen 112. In some examples, the information represented on the display screen 112 includes navigation information indicating the location and/or planned route of the vehicle (e.g., a map with the route laid out, a listing of past and/or upcoming turns along the route, estimated time of arrival to target destination, etc.). In some examples, the information represented on the display screen 112 includes notifications and/or indicators of the current operational states and/or conditions of the vehicle and/or other information that may be of interest to the passenger(s) (e.g., current speed, tire pressure, in-vehicle temperature, heating and/or air-conditioning settings, outdoor temperature, total mileage of vehicle, mileage of current trip, etc.). In some examples, the information represented on the display screen 112 identifies objects in the surrounding environment detected by the sensors 104 and/or the state, presence, proximity, and/or relative location of such objects (e.g., pedestrians, other vehicles, traffic signals, streets signs, lane divisions, road construction workers and/or equipment, hazards (e.g., potholes, debris, etc.), and so forth).

In connection with information representative of the surrounding environment, in some examples, the display screen 112 renders content indicative of dangerous situations presented by the detected environment. Often, when a dangerous situation is detected, the autonomous vehicle 100 may need to respond quickly to avoid an accident and/or otherwise keep the passenger(s) and or others in the surrounding environment safe. Sudden responses to dangerous situations may involve abrupt maneuvers by the vehicle 100 (e.g., applying the brakes hard, swerving to the side, performing a sudden lane change, etc.) that can be frightening to passenger(s), particularly when they are unaware of the danger. Some dangerous situations may not require an abrupt response but may nevertheless involve one or more actions by the vehicle 100 (e.g., slowing down, a gradual lane change, remaining stopped for an extended period of time, etc.) that cause the passenger(s) to wonder what the vehicle is doing. Accordingly, in some examples, in addition to representing when dangerous situations have been detected, the information represented on the display screen 112 provides explanations of how and/or why the autonomous vehicle 100 performed the actions it did in response to the situation.

In some examples, information regarding dangerous situations and associated response(s) implemented by the autonomous vehicle 100 are represented on the display screen 112 in substantially real-time. In many circumstances, the passenger(s) may not be looking at the display screen 112 when a dangerous situation is detected. Accordingly, in some examples, the passenger interface system 110 may provide an audible alert to inform the passenger(s) of the detected situation. Additionally or alternatively, in some examples, the identification of the dangerous situation and the following response may be replayed on the display screen 112 one or more times to give the passenger(s) an opportunity to understand what happened and why. In this manner, passenger may put their minds at ease after a sudden and potentially alarming moment. Furthermore, providing a representation of when a dangerous situation has been detected and how the autonomous vehicle responded to such situations, can give passenger(s) more confidence in the capabilities of the vehicle to detect and avoid dangerous situations in the future. In some examples, the identification of the dangerous situation and the corresponding response taken by the autonomous vehicle 100 is replayed automatically on the display screen 112 following the event. In other examples, the replay may be manually selected by the passenger(s). In some examples, the passenger(s) may dismiss the replayed event rather than allowing it to repeat.

Figure 2:
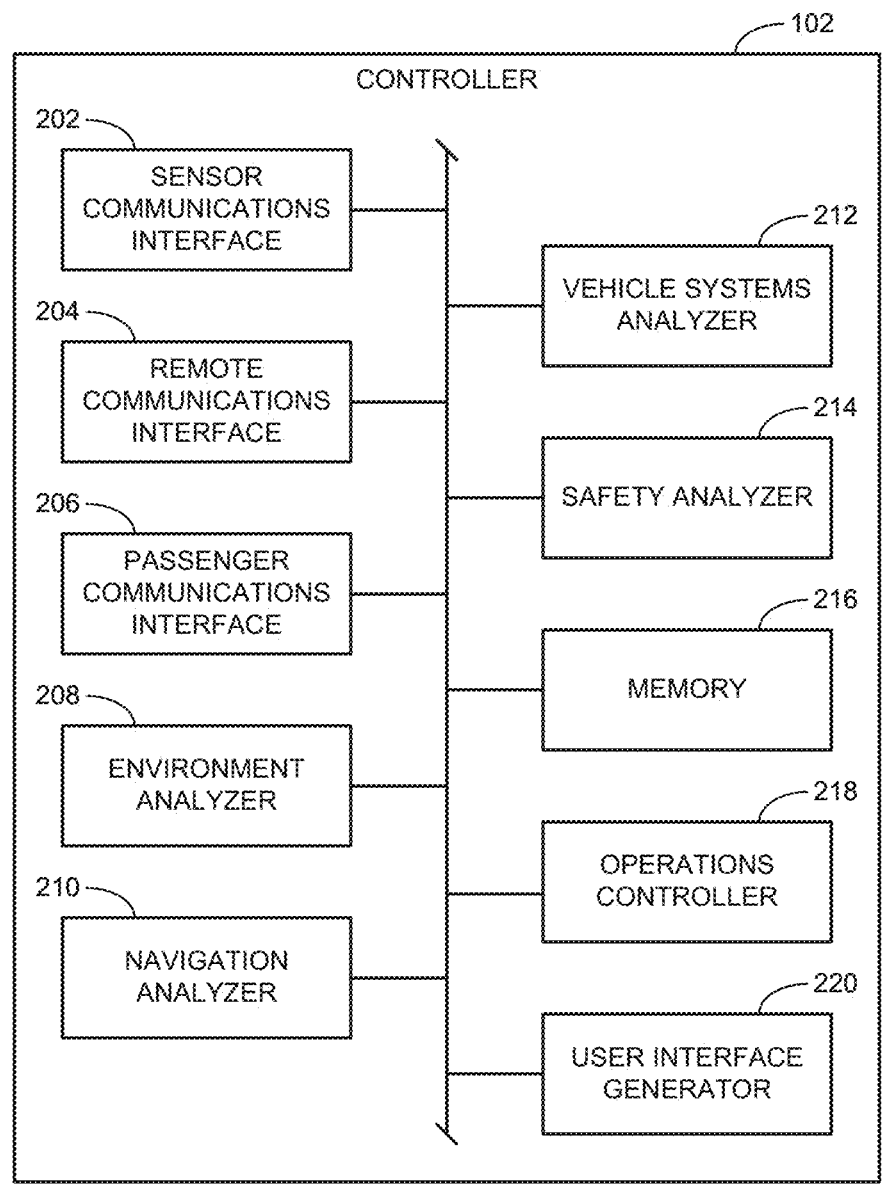
FIG. 2 is a block diagram illustrating an example implementation of the example controller of FIG. 1.

FIG. 2 is a block diagram illustrating an example implementation of the example controller 102 of FIG. 1. In the illustrated example, the controller 102, includes an example sensor communications interface 202, an example remote communications interface 204, an example passenger communications interface 206, an example environment analyzer 208, an example navigation analyzer 210, an example vehicle systems analyzer 212, an example safety analyzer 214, example memory 216, an example operations controller 218, and an example user interface generator 220.

The example sensor communications interface 202 enables communications between the controller 102 and the sensors 104. The example remote communications interface 204 enables communications between the controller 102 and the remote server 106 via the network 108. Additionally or alternatively, the remote communications interface 204 enables communications between the controller 102 and other nearby vehicles and/or other communication devices independent of the network (e.g., direct radio communications). The example passenger communications interface 206 enables communications between the controller 102 and the passenger interface system 110. In some examples, each of the sensor communications interface 202, the remote communications interface 204, and the passenger communications interface 206 are implemented independent of one another. In other examples, two or more of the sensor communications interface 202, the remote communications interface 204, and the passenger communications interface 206 may be integrated together as part of a single communications interface. In some examples, one or more of the sensor communications interface 202, the remote communications interface 204, and the passenger communications interface 206 may be implemented by and/or part of one or more portable computing devices (e.g., a smartphone, a tablet, a laptop, etc.).

The example environment analyzer 208 processes and/or analyzes feedback from the sensors 104 to determine the circumstances of the environment surrounding the autonomous vehicle 100. Additionally or alternatively, the example environment analyzer 208 may determine the circumstances of the environment surrounding the vehicle 100 based on communications from the remote server 106, from other nearby vehicles and/or from other devices in communication with the vehicle 100 (e.g., sensor systems built under roads and/or incorporated into the roadway infrastructure by local government and/or other entities). Based on such data from the sensors 104 and/or from remote sources, the example environment analyzer 208 identifies the presence, relative location, proximity, and/or speed of nearby vehicles. Further, the environment analyzer 208 may identify other objects and/or characteristics of the surrounding environment (e.g., identify pedestrians, street signs, traffic signals, road markings, etc.) based on the sensor feedback and/or other data reported from remote sources. In some examples, the identification of characteristics of and/or objects in the surrounding environment are based on the implementation of one or more artificial intelligence models (e.g., such model(s) may be local (e.g., included in the example memory 216) or remote (e.g., present in the cloud and accessible via a wireless network)).

The example navigation analyzer 210 processes and/or analyzes feedback from the sensors 104 to determine the location of the autonomous vehicle 100. For example, the navigation analyzer 210 may associate feedback from a GPS sensor with map data to determine the current location of the vehicle and to develop and/or update a route for the autonomous vehicle 100 to navigate towards a specified destination. In some examples, the map data may be stored locally in the example memory 216. In other examples, the navigation analyzer 210 may communicate with the remote server 106 to obtain the map data and/or to develop a planned route for the vehicle 100.

The example vehicle systems analyzer 212 processes and/or analyzes feedback from the sensors 104 to determine the operational states and/or condition(s) of systems of the vehicle. For example, the vehicle systems analyzer 212 may determine the speed of rotation of the wheels, the angle at which the wheels are pointing, the longitudinal (front-to-back) and/or lateral (side-to-side) acceleration of the vehicle, etc.

The example safety analyzer 214 processes feedback from the sensors 104, information from remote sources (e.g., the remote server 106, other nearby vehicles, nearby infrastructure, etc.), and/or outputs of one or more of the environment analyzer 208, the navigation analyzer 210, and/or the vehicle systems analyzer 212 to detect dangerous driving situations and/or determine that the vehicle 100 is currently in safe circumstances. In some examples, the safety analyzer 214 identifies dangerous situations by analyzing the available data about the surrounding environment and the current operational state of the vehicle relative to safe driving definitions or rules. In some examples, whenever circumstances associated with the vehicle 100 violate a safe driving rule, the safety analyzer 214 determines that a dangerous situation is present. In some examples, the safe driving rules correspond to deterministic mathematical formulas associated with a safety model stored in the example memory 216. In some examples, the safety model is the Responsibility Sensitive Safety (RSS) model being developed by INTEL®. Other models may also be used.

The RSS model is premised on basic rules of driving that are commonly practiced among human drivers (either by legal mandate or through implicit adoption based on principles of common sense and/or reasonableness). The RSS model is described in Shalev-Shwartz et al., "On a Formal Model of Safe and Scalable Self-driving Cars," Mobileye, 2017, last revised Oct. 27, 2018, 37 pages, and which is incorporated herein by reference in its entirety. At a high level, the RSS model includes five basic rules that may be characterized as follows: (1) do not hit someone from behind, (2) do not cut-in recklessly, (3) right-of-way is given, not taken, (4) be careful of areas with limited visibility, and (5) avoid an accident without causing another one whenever possible.

From the basic rules outlined above, the RSS model defines particular safe driving rules that can be expressed mathematically for analysis by the safety analyzer 214. Take for example, the first basic rule of not hitting someone from behind. For this basic rule to be satisfied, it is necessary for a vehicle to remain a safe longitudinal distance behind another vehicle when both vehicles are travelling in the same direction. Obviously, what constitutes a safe longitudinal distance depends on the circumstances including the speed of the vehicles and how quickly the vehicles are able to decelerate until stopped. The minimum longitudinal distance that is safe (e.g., provides sufficient time and space to avoid a collision) for a first (rear) vehicle following a second (front) vehicle moving in the same direction is expressed mathematically in Equation 1:

$$d_{min,long} = \left[ v_r \rho + \frac{1}{2} \alpha_{max} \rho^2 + \frac{(v_r + \rho \alpha_{max})^2}{2\beta_{min}} - \frac{v_f^2}{2\beta_{max}} \right]_+ \quad \text{Eq. 1}$$

where $v_r$ is the velocity of the rear vehicle, $v_f$ is the velocity of the front vehicle, $\rho$ is the response time of the rear vehicle, $\alpha_{max}$ is the maximum acceleration of the rear vehicle during the response time, $\beta_{min}$ is the minimum deceleration of the rear vehicle due to braking initiated after the response time, $\beta_{max}$ is the maximum deceleration of the front vehicle, and where the notation $[x]_+:=\max\{x, 0\}$. Equation 1 is written broadly enough to contemplate different response times of different vehicles and to account for different rates of acceleration and deceleration of such vehicles. In some examples, the safety analyzer 214 determines the response time as the time it takes for feedback from the sensors 104 to be collected plus the time it takes to analyze such data to determine whether a dangerous situation is present and the time to determine and implement a proper response.

In some examples, the safety analyzer 214 determines the values for the velocity, acceleration, and deceleration parameters in Equation 1 based on feedback from the sensors 104 (e.g., feedback may indicate wet and/or slippery roads indicating deceleration will be slower than on dry roads) and/or based on tabulated values for particular types of vehicles identified from the sensor feedback (e.g., large semi-trucks take longer to accelerate and decelerate than smaller vehicles). Such tabulated values may be stored locally in the memory 216 and/or obtained from the remote server 106. In some examples, the tabulated values may be defined in advance in accordance with one or more standards. Additionally or alternatively, in some examples, values for one or more of the parameters in Equation 1 may be provided by other vehicles and/or other infrastructure in the vicinity of the vehicle 100. For example, if the vehicle 100 is following behind a truck, the truck may provide values regarding its velocity, acceleration, and deceleration under current circumstances to the controller 102 of the vehicle 100 (e.g. via radio communications with the remote communications interface 204 of the controller 102). Further, in some examples, sensors maintained by a local city government and/or other entities at fixed locations (e.g., underground, on traffic poles, on lamp posts, etc.) may determine values for one or more of the parameters and provide the same to the vehicle 100 (e.g. via radio communications with the remote communications interface 204 of the controller 102). Once the parameters for Equation 1 are defined and/or determined, the safety analyzer 214 may analyze the equation to determine the safe longitudinal distance under the circumstances. If the sensor feedback (as analyzed by the environment analyzer 208) indicates a vehicle in front of the autonomous vehicle 100 is within the safe longitudinal distance, the safe driving rule defined by Equation 1 has been violated and the safety analyzer 214 determines a dangerous situation is present. Such a determination then triggers the initiation of a proper response (e.g., applying the brakes, steering around the front vehicle, etc.) until a distance between the autonomous vehicle 100 and the other vehicle is again equal to or greater than the safe longitudinal distance.

In some examples, parameters for a proper response may also be defined by safe driving rules included in the safety model stored in the example memory 216. For example, as explained above with respect to the safe longitudinal distance defined by Equation 1, there are assumed maximum and minimum acceleration and deceleration rates for the vehicles. Accordingly, in some examples, a proper response to a dangerous longitudinal distance situation (e.g., when Equation 1 has been violated) includes maintaining the acceleration of the vehicle at or below $\alpha_{max}$ and at or above $\beta_{min}$ during the relevant time periods associated with the response time $\rho$. Following this rule will enable the autonomous vehicle 100 to safely resolve the dangerous situation by restoring a safe longitudinal distance between itself and the vehicle in front of itself. Obviously, the autonomous vehicle 100 does not have any control of the deceleration of the front vehicle. Accordingly, in some examples, the value for #max is assumed conservatively.

While keeping at a safe longitudinal distance can reduce (e.g., avoid) rear-end collisions, collisions may also occur from the side. Accordingly, another safe driving rule defining a safe lateral distance between a first vehicle that is to the left of a second vehicle can be expressed mathematically by Equation 2:

$$d_{min,lat} = \mu + \left[\frac{(v_1 + v_{1,\rho})}{2}\rho + \frac{v_{1,\rho}^2}{2\beta_{1,lat,min}} - \left(\frac{(v_2 + v_{1,\rho})}{2}\rho + \frac{v_{2,\rho}^2}{2\beta_{2,lat,min}}\right)\right]_+ \quad \text{Eq. 2}$$

where $\mu$ is a baseline lateral distance between the two vehicles, $v_1$ is the velocity of the first vehicle (e.g., the autonomous vehicle 100 applying Equation 2), $\beta_{1,lat,min}$ is the minimum lateral deceleration of the first vehicle following the response time, $\beta_{2,lat,min}$ is the minimum lateral deceleration of the second vehicle following the response time, and $v_{1,\rho}$ is defined as $v_1 - \rho\alpha_{lat,max}$ and $v_{2,\rho}$ is defined as $v_2 - \rho\alpha_{lat,max}$ (where $\alpha_{lat,max}$ is the maximum lateral acceleration of the two vehicles toward each other during the response time).

As with Equation 1, the safety analyzer 214 may determine values for the parameters of Equation 2 and then evaluate the equation to determine the safe lateral distance ($d_{min,lat}$). More particularly, as described above in connection with Equation 1, the safety analyzer 214 may determine values for the parameters in Equation 2 based on feedback from sensors, based on tabulated values that may be remotely or locally stored, and/or based on data provided from other vehicles, devices, and/or infrastructure in the vicinity of (e.g., within direct radio communication range of) the vehicle 100. If the defined and/or determined values for the parameters in Equation 2 indicate that a vehicle is within the safe lateral distance, the safety analyzer 214 determines that there is a dangerous situation. Such a determination may trigger the initiation of a proper response (e.g., veering away from a laterally encroaching vehicle, changing lanes, applying the brakes, accelerating, etc.) until a lateral distance between the autonomous vehicle 100 and the other vehicle is again equal to or greater than the safe longitudinal distance. In some examples, a proper response to a dangerous lateral distance situation is also defined by specific safe driving rules stored in the memory 216.

The longitudinal safe distance driving rule (mathematically expressed in Equation 1) and the lateral safe distance driving rule (mathematically expressed in Equation 2) and the corresponding proper response rules for each are just some example safe driving rules that may be included in the safety model stored in the memory 216. Other example rules may define the constraints and/or requirements for other circumstances including the avoidance of an accident (e.g., a collision) without causing another accident, the right-of-way between two flows of traffic being crossed and/or combined (e.g., at intersections, when one lane merges into another, etc.), situations where there is reduced visibility (e.g., in foggy conditions, behind structures or objects along the side of roads that may be occluding a pedestrian seeking to cross the road, etc.), situations where there are no marked lanes (e.g., parking lots, unstructured roads, etc.), and so forth. As mentioned above, the safe driving rules in the safety model are mathematically defined such that violations or compliance of such rules may be deterministically analyzed. Further, in some examples, the safe driving rules are defined such that if all vehicles comply with the rules, no accident between such vehicles should occur. Of course, it may be possible for a different vehicle, which does not follow the safe driving rules of the safety model, to cause an accident. That is, while the safe driving rules are premised on basic common sense rules that most drivers are likely to adhere to, there may be circumstances where a particular vehicle (e.g., a particular driver) behaves in a manner inconsistent with the safe driving rules of the safety model that could result in an accident. Accordingly, in some examples, to reduce the likelihood of accidents caused by such drivers, the safety model may define additional safe driving rules defining constraints and/or requirements for evasive maneuvers made in response to the above situations to avoid accidents while reducing the likelihood of causing another accident.

In the illustrated example of FIG. 2, the environment analyzer 208, the navigation analyzer 210, the vehicle systems analyzer 212, and the safety analyzer 214 are shown as separate elements of the controller 102. However, in some examples, one or more of these elements may be combined and/or integrated into a common analyzer that performs some or all of the functionality of the individually described elements.

The example operations controller 218 controls the operation of the vehicle 100 based on the outputs of the environment analyzer 208, the navigation analyzer 210, the vehicle systems analyzer 212, and/or the safety analyzer 214. For instance, in some examples, the operations controller 218 may control various systems of the vehicle 100 (monitored by the vehicle systems analyzer 212) to respond to objects and circumstances detected in the surrounding environment (as detected by the environment analyzer 208) to navigate the vehicle towards a desired destination (based on a route provided by the navigation analyzer 210). Further, the operations controller 218 implements the proper responses associated with the particular dangerous situations detected by the safety analyzer 214.

The example user interface generator 220 generates user interface data that may be used to render and/or display user interfaces on the display screen 112 of the passenger interface system 110. In some examples, the user interface generator 220 may render the user interfaces for display. In other examples, the user interface generator 220 may pass the user interface data to a renderer that may be implemented by the controller and/or a separate device. For instance, in examples where the display screen 112 is associated with a portable computing device (e.g., a smartphone, a tablet, a laptop, etc.), the user interface generator 220 generates user interface data that is provided to the portable computing device (e.g., via the passenger communications interface 206) to be further processed for rendering via the display screen of the portable computing device. Further, although the illustrated example shows the user interface generator 220 as associated with the controller 102, in some examples, some or all of the functionality of the user interface generator 220 may be performed by and/or duplicated in a separate device in communication with the controller 102. For instance, in examples where the display screen 112 is associated with a portable computing device carried by a passenger in the vehicle 100, the portable computing device may include its own user interface generator to generate the user interface data used to render and/or display user interfaces for display based on data generated and provided by the user interface generator 220 of the controller 102 and/or based on data from one or more of the other components of the controller 102.

In some examples, the user interface data generated by the user interface generator 220 for the user interfaces are based on outputs of the environment analyzer 208, the navigation analyzer 210, the vehicle systems analyzer 212, and/or the safety analyzer 214 and/or based on the actions implemented by the operations controller 218. In some examples, a limited set of information that is likely to be of particular interest to passenger(s) is displayed in the user interfaces. Example user interfaces 300, 400 are separately shown in the illustrated examples of FIGS. 3 and 4. In some examples, the user interface data generated by the user interface generator 220 may also define audible outputs to be produced by the passenger interface system 110 in connection with the content rendered via the display screen 112. In some examples, the audible outputs may be a bell or other sound to alert the passenger of a dangerous situation and/or other circumstances. In some examples, the audible outputs include natural language describing the dangerous situation and/or describing what the vehicle 100 is doing to resolve the dangerous situation. Further, in some examples, the user interface generator 220 may define other types of outputs and/or feedback to alert and/or attract the attention of passenger(s) (e.g., a physical, tactile, and/or haptic output, interrupting music, video and/or other media playing in the vehicle 100, etc.). In some examples, such outputs may be independent of the display screen 112. For examples, a haptic/tactile output may be generated by vibrating a seat in the vehicle 100. In some examples, the manner in which the outputs and/or feedback are conveyed to passengers corresponds to communication mechanisms typical for individuals with disabilities (e.g., the hearing impaired, the visually impaired, etc.) to enable such individuals to become aware of the dangerous situation and/or other circumstances that they may not otherwise because of their disability.

Figure 3:
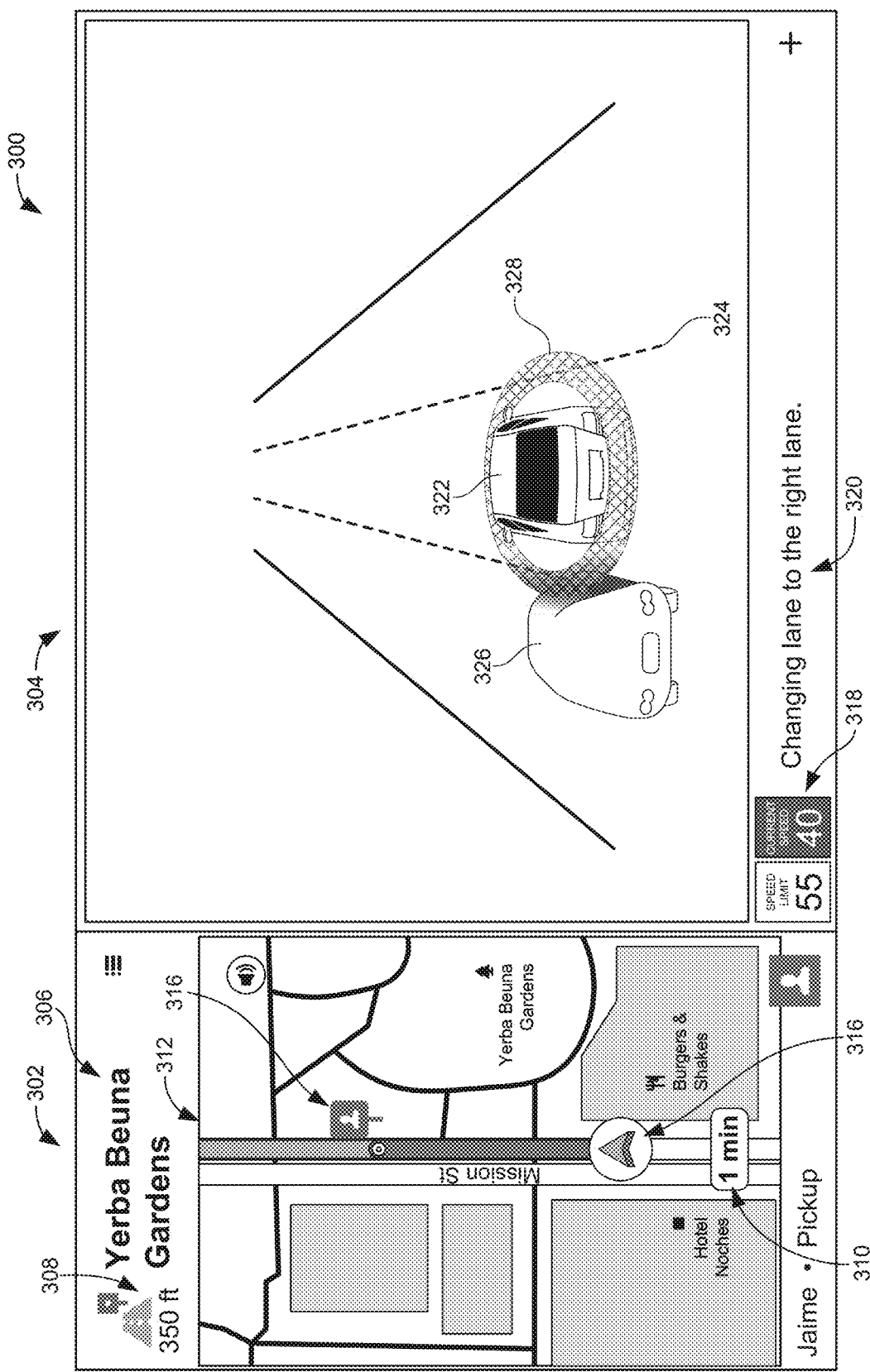
FIGS. 3 and 4 illustrate two example user interfaces generated in accordance with teachings disclosed herein.

The example user interface 300 of FIG. 3 is divided into two portions including a navigation panel 302 and a current circumstances panel 304. Although the navigation panel 302 and the current circumstances panel 304 are shown side-by-side in a single user interface 300, in some examples, the separate panels 302, 304 may be divided to be displayed separately. For instance, in some examples, a user may toggle between a display of the navigation panel 302 at one point in time and the current circumstances panel 304 at a different point in time. In some examples, the navigation panel 302 is provided via a first display screen 112 of the passenger interface system 110 and the current circumstances panel 304 is provided via a second display screen 112 of the passenger interface system 110. In some examples, either the first display screen or the second display screen corresponds to a screen on a portable computing device (e.g., a smartphone, tablet, laptop, etc.) of one of the passengers in the vehicle 100 and the other display screen is integrated and/or built into the vehicle 100. In some examples, the screens from multiple different portable computing devices may be used to display some or all of the content of the user interface 300 of FIG. 3.

The navigation panel 302 represents navigation based information, which may include one or more of a target destination 306, a distance 308 to the target destination, an estimated time 310 until arriving at the destination, a map 312 showing a destination location 314 and/or a current vehicle location 316. The current circumstances panel 304 includes a representation of current (e.g., substantially real-time) circumstances of the operations of the autonomous vehicle 100. For instance, in the illustrated example, the current circumstances panel 304 provides a current speed indicator 318 and a current driving operation indicator 320 (e.g., provided via natural language text). Additionally or alternatively, in some examples, the current circumstances panel 304 includes a graphical representation of the current circumstances detected in the surrounding environment of the autonomous vehicle 100. In some examples, all aspects of the surrounding environment detected by the autonomous vehicle 100 are represented in the current circumstances panel 304 of the user interface 300. However, this may provide too much information for a passenger to quickly and easily understand. Accordingly, in the illustrated example, the graphical representation of the surrounding environment includes less than all details detected by the vehicle 100. Among other things, the current circumstances panel 304 may include an ego vehicle graphic 322 representative of the autonomous vehicle 100 that is situated within lane markings 324 corresponding to the road in the real world on which the vehicle 100 is driving. In some examples, other objects detected in the surrounding environment, such as other nearby vehicles, and their relative position to the vehicle 100 may also be represented in the current circumstances panel 304 by a suitable icon 326. Providing the ego vehicle graphic 322 enables passenger(s) to understand how the aspects of the surrounding environment relate to the vehicle 100.

In some examples, the current circumstances panel 304 includes a representation of whether the surrounding circumstances are safe and/or present dangerous driving situations as defined by the safe driving rules associated with the safety model (e.g., the RSS model) stored in the memory 216. In some examples, safe and/or dangerous situations are represented within the current circumstances panel 304 via a safety boundary graphic 328. In some examples, the safety boundary graphic 328 has a first appearance or state (e.g., a first color, a first intensity, a first transparency, a first shape, etc.) when no dangerous situations are detected (e.g., the vehicle 100 is currently in safe circumstances) and changes to a second appearance or state (e.g., a second different color, a second different intensity, a second different transparency, a second different shape, flashing, etc.) when one or more dangerous situations are detected. In some examples, only a portion of the safety boundary graphic 328 corresponding to the direction of the object(s) giving rise to the dangerous situation change appearance while the rest of the safety boundary graphic 328 retains the appearance corresponding to safe circumstances.

As a specific example, a dangerous situation is shown in the illustrated example of FIG. 3 caused by the encroachment of the other vehicle 326 into the lane occupied by the ego vehicle 322. This dangerous situation is determined by the safety analyzer 214 based on the distance between the two vehicles 322, 326 dropping below the safe lateral distance as defined by Equation 2 outlined above. Accordingly, in this example, upon detecting the dangerous situation (e.g., when the safe lateral distance rule has been violated), the user interface generator 220 updates the safety boundary graphic 328 to change the appearance (e.g., color) of the graphic in the area associated with the position of the encroaching vehicle 326. In some examples, as shown in FIG. 3, the user interface generator 220 may also change the appearance (e.g., color) of some or all of the encroaching vehicle icon 326 to highlight the source of the dangerous situation represented by the change in appearance of the safety boundary graphic 328. Additionally, in response to detecting the dangerous situation and representing the same on the user interface 300, the operations controller 218 implements operations corresponding to a proper response to the dangerous situation. As described above, the proper response may also be defined by rules in the safety model stored in the memory 216. In the illustrated example, where the vehicle is encroaching from the left and there is an open lane to the right, the proper response may be to change lanes to the right. For this reason, the current driving operation indicator 320 in the illustrated example specifies a lane change to the right.

Providing the safety boundary graphic 328 that changes appearance in response to the safety analyzer 214 detecting a dangerous situation as outlined above enables a passenger to quickly and easily comprehend whether the vehicle 100 is in a dangerous situation or currently safe. Further, when a dangerous situation is present, the information represented on the user interface 300 also enables a passenger to understand how the vehicle 100 is able to avoid the dangerous situation and/or to understand why the vehicle 100 may have made a sudden maneuver (e.g., sudden lane change). Of course, a passenger is benefited from the graphical representation of the dangerous situation and subsequent response only if the passenger was actually looking at the user interface 300 at the time the situation occurred because the graphical representation is provided in substantially real-time to the occurrence of the event. However, as mentioned above, people typically do not spend their time in an autonomous vehicle staring at a confidence screen such as the user interface 300. Rather, a passenger may be looking out the window, reading a book, talking with another passenger, sleeping, and/or engaged in any other activity. Accordingly, in some examples, the dangerous situation and subsequent response actions may be replayed one or more times on the user interface 300 following the event.

Figure 4:
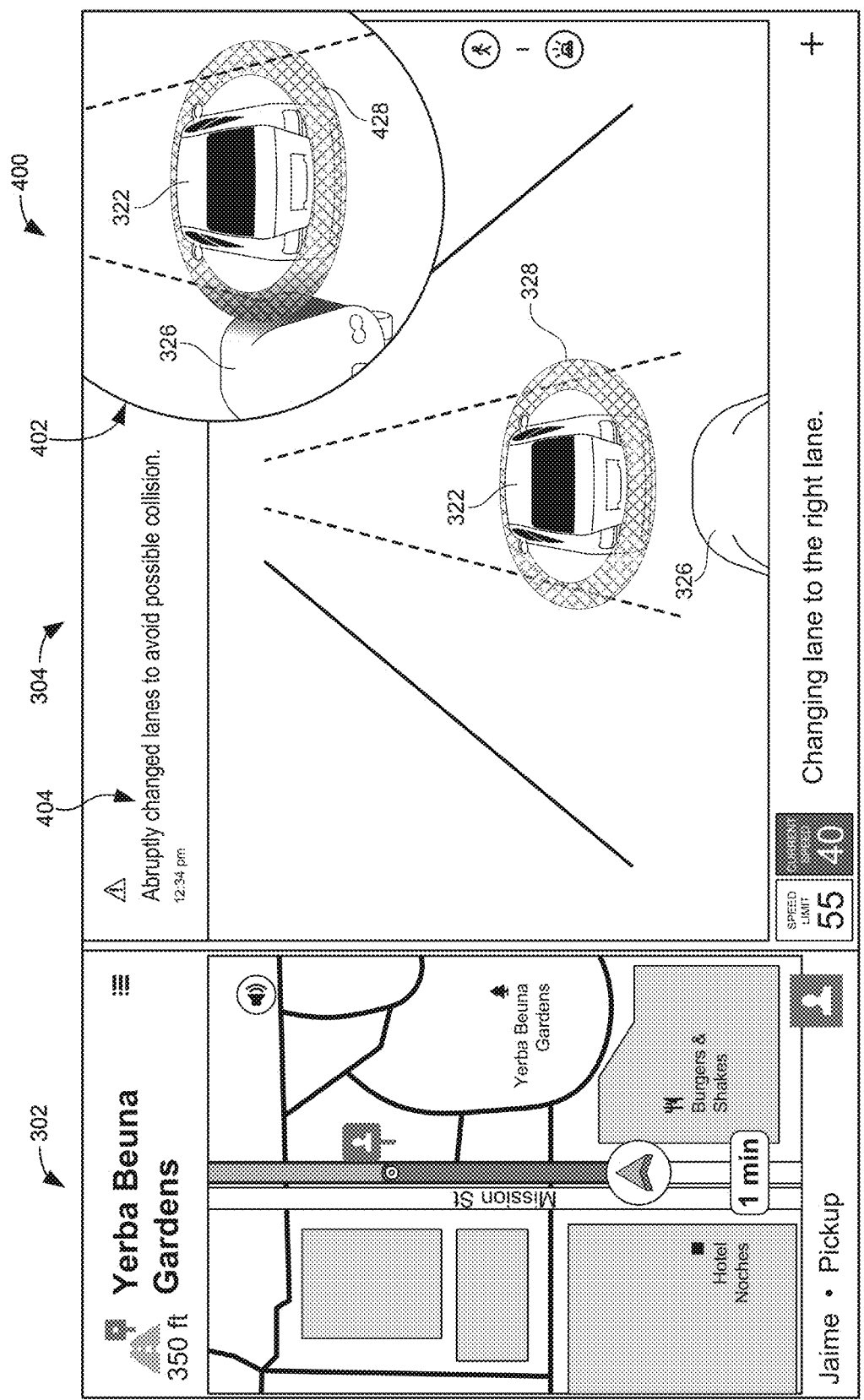

In particular, FIG. 4 illustrates an example user interface 400 that is substantially similar to the user interface 300 of FIG. 3, except that the user interface 400 represents a slightly later point in time and includes a replay window 402 overlaid and/or provided alongside the main current circumstances panel 304. As shown in the illustrated example of FIG. 4, the replay window 402 includes the same graphical representation of the dangerous situation that was provided in the user interface 300 of FIG. 3. In this example, the user interface 400 of FIG. 4 continues to show the current (e.g., substantially real-time) circumstances of the autonomous vehicle 100 based on the ego vehicle graphic 322 and associated safety boundary graphic 328 in the main portion of the current circumstances panel 304. At the particular point in time represented in the illustrated example of FIG. 4, the autonomous vehicle 100 (represented by the ego vehicle graphic 322) has returned to the center lane with the other vehicle 326 now behind at a safe distance as reflected by the fact that the entire safety boundary graphic 328 is the same appearance (e.g., color) corresponding to safe circumstances.

In some examples, the graphical representation of the replay of the dangerous situation may be provided in the main portion of the current circumstances panel 304 with the real-time circumstances represented in a smaller overlaid window. In some examples, a passenger may choose to toggle between the real-time view and the replay view within the main portion and an overlaid window of the user interface 400. In some examples, the replay of the dangerous situation may (either automatically or in response to user selection) fill the entirety of the current circumstances panel 304 with the current real-time view being momentarily suppressed from display. In some examples, once the replay of the dangerous situation has completed a threshold number of times, the replay window 402 may automatically be removed to again display the real-time view of the current circumstances. In some examples, in addition to providing a replay of the graphical representation of the dangerous situation and corresponding response, the user interface 400 may also provide a text based explanation of what the vehicle 100 did and why as shown by the text identified at reference numeral 404. Further, in some examples, audio outputs (e.g., sounds, audio messages, etc.) may also be generated during the replay of a dangerous situation.

In some examples, the replay of a dangerous situation may include a window of time that begins before the dangerous situation was actually detected and extends until after the vehicle has been restored to a safe situation. Accordingly, in some examples, the example memory 216 stores the collected feedback from the sensor 104 into a circular buffer to be able to reconstruct the sequence of events leading up to, including, and following a dangerous situation. In some examples, generated replays of dangerous situations may be separately stored for longer term retrieval (e.g., after the circular buffer has been replaced with subsequent data). In some examples, the replay may be generated automatically following the detection and resolution of a dangerous situation. Additionally or alternatively, the replay may be provided in response to user input selecting the same. In some examples, the user interface may include playback control options for the replay (e.g., play, pause, rewind, adjust speed, make full screen, etc.)

Some dangerous situations may last momentarily and/or involve little or no sudden maneuvers that would be perceived by passenger(s) as out of the ordinary. In some such examples, there may be no need to specifically alert the passenger(s) to draw attention to the situation and/or to automatically provide a reply of the event. Accordingly, in some examples, audible notifications of dangerous situations and/or the rendering of a replay of a dangerous situation may be limited to certain circumstances that satisfy one or more thresholds. In some examples, the thresholds may be based on one or more of the duration of a detected dangerous situation, the frequency of repeating dangerous situations (e.g., repeated stops and starts in heavy traffic), the nature of the dangerous situation (e.g., whether a common occurrence or a rare circumstance), the nature of the changes in vehicle dynamics implemented in response to the dangerous situation (e.g., values, changes, and/or rates of change in inertial momentum, velocity, acceleration/deceleration, direction of wheels, etc.). In some examples, the threshold may be customizable by an end user and/or variable depending on environmental factors (e.g., outside temperature, wet versus dry roads, etc.).

As mentioned above, whether the autonomous vehicle 100 is current in a safe situation or facing a dangerous situation (as defined by the relevant safety model rules) is graphically represented by the safety boundary graphic 328 surrounding the ego vehicle graphic 322. In the illustrated example, the safety boundary graphic 328 corresponds to a ring surrounding the ego vehicle graphic 322. In other examples, the safety boundary graphic 328 is another shape (e.g., a cylinder, a dome, a rectangle, a box, etc.). In some examples, the safety boundary graphic 328 (or a portion thereof) may appear only when a dangerous situation is detected. That is, in some examples, no safety boundary graphic 328 represented on the user interfaces 300, 400 indicates the vehicle 100 is currently determined to be in a safe situation. In some examples, rather than changing the appearance of a safety boundary graphic 328 surrounding the ego vehicle graphic 322, the appearance of the ego vehicle graphic 322 (or a portion thereof) may change appearance (e.g., change color) to indicate a dangerous situation is detected.

As described above, in some examples, the determination of a dangerous situation is based on an analysis of safety rules associated with the RSS model stored in the memory 216. The RSS model operates in a situation based coordinate system translated from Cartesian coordinates, which does not directly correspond to the safety boundary graphic 328 in a ring shape as shown in the illustrated examples. Accordingly, in some examples, to properly render the location of a dangerous situation on the ring by modifying a relevant portion of the safety boundary graphic, the user interface generator 220 identifies the objects detected in the surrounding environment giving rise to the dangerous situation (e.g., other vehicles less than the safe distances defined by the RSS model rules) and performs a second order projection of the locations of the objects onto the safety boundary graphic 328. The second order projection enables the lateral and longitudinal distances of a detected object (e.g., nearby vehicle) to be designated on the ring of the safety boundary graphic 328 to identify the portion(s) of the graphic 328 that are to change appearance (e.g., change color). This is diagrammatically represented in FIG. 5. An example methodology to calculate this second order projection is outlined in Hu et al., "A second order algorithm for orthogonal projection onto curves and surfaces," Elsevier Science, Feb. 14, 2005, 11 pages, and which is incorporated herein by reference in its entirety.

Figure 5:
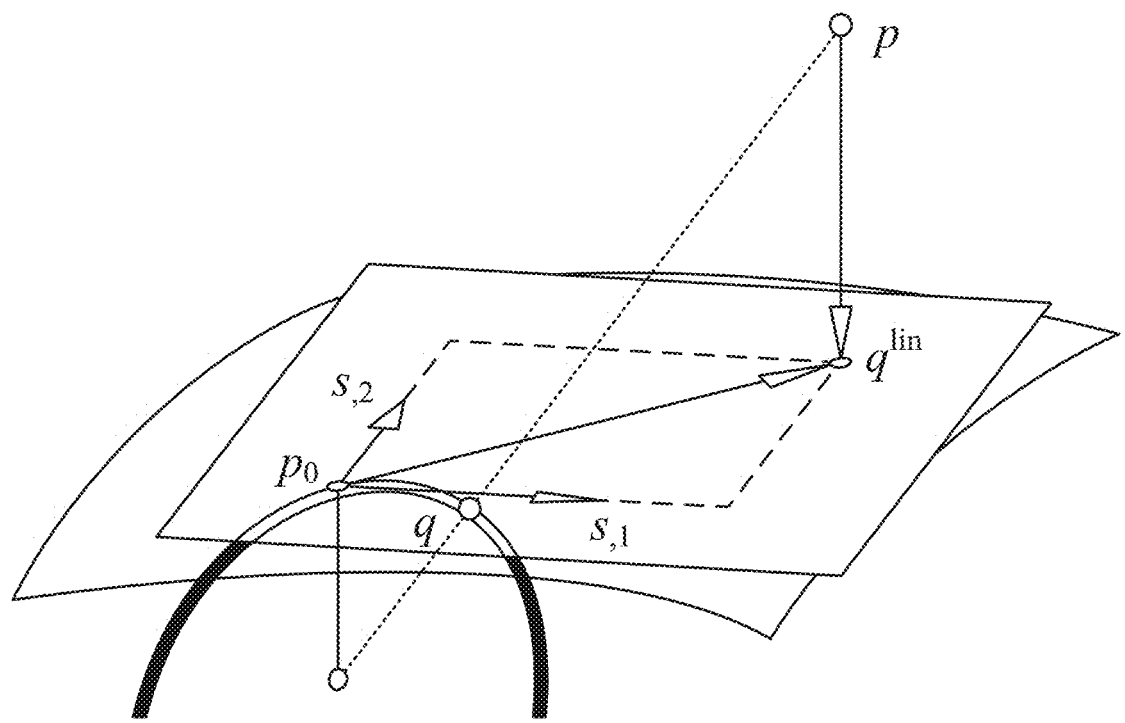
FIG. 5 is a diagram illustrating a second order projection of a point onto a tangent plane of a curved surface

FIG. 5 is a diagram illustrating a second order projection of a point (p) onto a tangent plane of a curved surface at point $p_0$ based on Equation 3:

$$q - p_0 = s_1 \cdot \Delta u^1 + s_2 \cdot \Delta u^2 \qquad \text{Eq. 3}$$

where $\Delta u^1$ and $\Delta u^2$ can be computed as a solution to a regular system of linear equations. Equation 3 may be solved to any suitable accuracy. In some examples, the accuracy and/or granularity of the calculations may be relatively low to reduce computational complexity because the purpose of such calculations do not affect the operation and/or safety of the vehicle but are merely to provide a visual representation of a dangerous situation to passenger(s) that can be quickly and easily understood. Although Equation 3 may be evaluated to determine the second order projection, this transformation may alternatively be done using any other suitable method.

In some examples, user interfaces rendered by the user interface generator 220 are provided to the passenger interface system 110 (via the passenger communications interface 206) for display on the associated display screen 112. Although the user interface generator 220 is shown and described as part of the example controller 102, in some examples, the user interface generator 220 and/or some of its functionality may additionally or alternatively be implemented directly by the passenger interface system 110.

In some examples, the controller 102 is combined with the passenger interface system 110. In some such examples, both the controller 102 and passenger interface system 110 are integrated and/or built into the vehicle 100. In other examples, both the controller 102 and the passenger interface system 110 are implemented by a portable computing device (e.g., a smartphone, a tablet, a laptop, etc.) that is separate from the vehicle 100. In some examples, one or more of the elements of the controller 102 shown in FIG. 2 are implemented by a portable computing device separate from the vehicle while other elements of the controller 102 are integrated into the vehicle 100. Further, in some examples, some or all of the elements of the controller 102 and/or their associated functionalities may be duplicated in both the vehicle 100 and a separate portable computing device (e.g., a smartphone, a tablet, a laptop, etc.).

While an example manner of implementing the example controller 102 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor communications interface 202, the example remote communications interface 204, the example passenger communications interface 206, the example environment analyzer 208, the example navigation analyzer 210, the example vehicle systems analyzer 212, the example safety analyzer 214, the example memory 216, the example operations controller 218, the example user interface generator 220, and/or the example controller 102 of FIG. 1 may be implemented by hardware, software, firmware and/or any combination of hardware, software and/or firmware. Thus, for example, any of the example sensor communications interface 202, the example remote communications interface 204, the example passenger communications interface 206, the example environment analyzer 208, the example navigation analyzer 210, the example vehicle systems analyzer 212, the example safety analyzer 214, the example memory 216, the example operations controller 218, the example user interface generator 220, and/or the example controller 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor communications interface 202, the example remote communications interface 204, the example passenger communications interface 206, the example environment analyzer 208, the example navigation analyzer 210, the example vehicle systems analyzer 212, the example safety analyzer 214, the example memory 216, the example operations controller 218, and/or the example user interface generator 220 is/are hereby expressly defined to include a non-transitory computer readable storage device or storage disk (e.g., a memory, a digital versatile disk (DVD), a compact disk (CD), a Blu-ray disk, etc.) that includes the software and/or firmware. Further still, the example controller 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
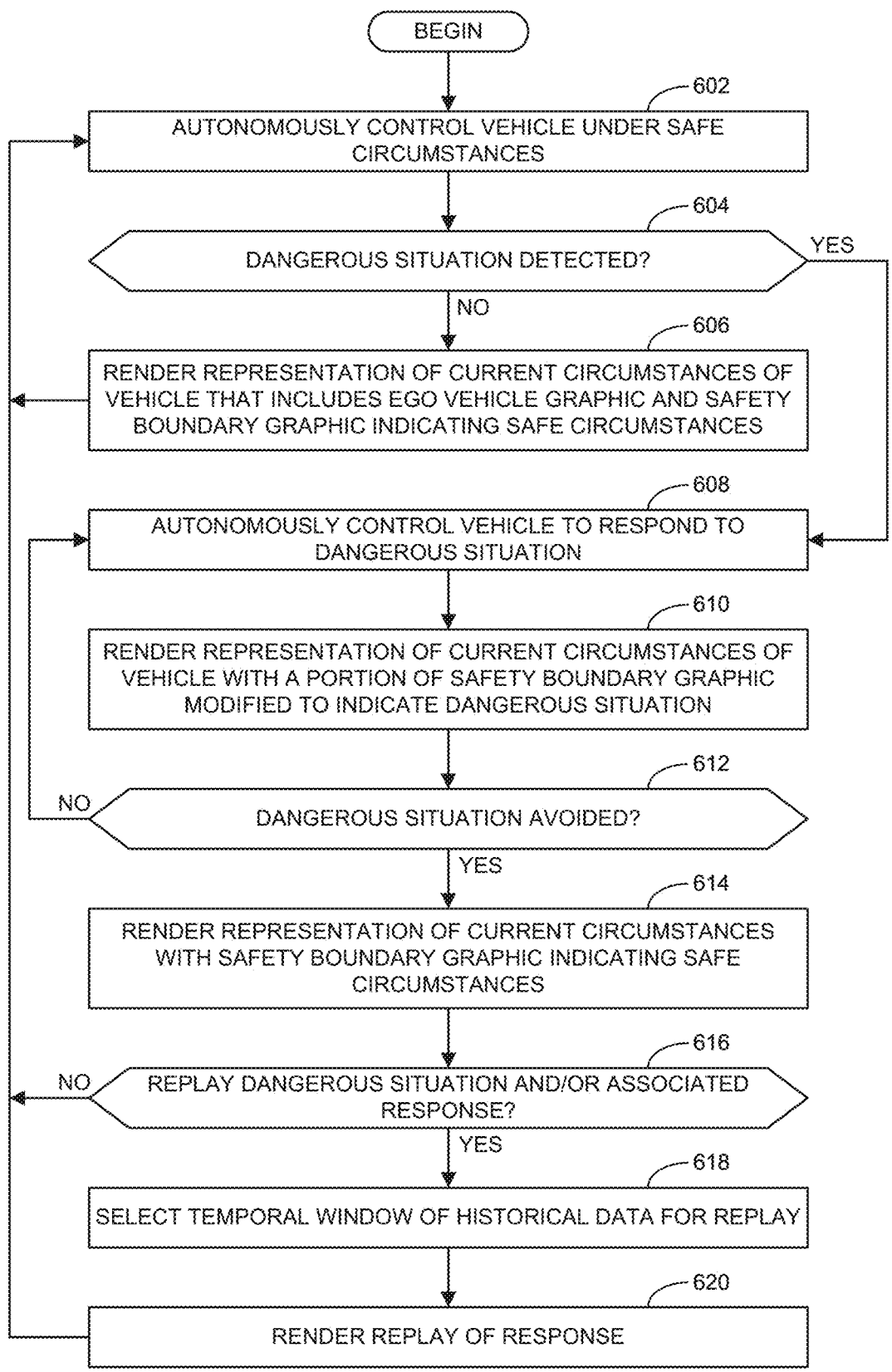
FIG. 6 is a flowchart representative of example machine readable instructions which may be executed to implement the example controller of FIGS. 1 and/or 2.

A flowchart representative of example hardware logic, machine readable instructions, hardware implemented state machines, and/or any combination thereof for implementing the controller 102 of FIGS. 1 and/or 2 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 6 begins at block 602 where the example operations controller 218 autonomously controls the vehicle 100 under safe circumstances. That is, the operations controller 218 controls the operations of the autonomous vehicle to navigate through the surrounding environment to a target destination under circumstances where no dangerous situation has been detected. At block 604, the example safety analyzer 214 determines whether a dangerous situation has been detected. As described above, the safety analyzer 214 detects a dangerous situation based on the violation of a safe driving rule mathematically defined by the safety model (e.g., the RSS model). If no dangerous situation is detected, control advances to block 606 where the example user interface generator 220 renders a representation of current circumstances of the vehicle 100 that includes an ego vehicle graphic 322 and a safety boundary graphic 328 indicating safe circumstances. Thereafter, control returns to block 602.

Returning to block 604, if the example safety analyzer 214 detects a dangerous situation, control advances to block 608 where the operations controller 218 autonomously controls the vehicle 100 to respond to the dangerous situation. In some examples, the particular response implemented by the operations controller 218 is based on one or more safe driving rules defined by the safety model that also defines the dangerous situation. At block 610, the example user interface generator 220 renders a representation of the current circumstances of the vehicle 100 with a portion of the safety boundary graphic 328 modified to indicate the dangerous situation. In some examples, the portion of the safety boundary graphic 328 is modified based on a change in color (e.g., from blue to red). In some examples, the location of the modified portion of the safety boundary graphic 328 is determined based on the safe lateral and/or longitudinal distances that were violated to give rise to the dangerous situation. In some examples, the particular location of the modified portion of the safety boundary graphic 328 is determined by transforming the coordinates of the relevant lateral and/or longitudinal distances to the shape of the safety boundary graphic 328. Although block 610 is shown and described as occurring after block 608, in some examples, implementation of blocks 608 and 610 may be performed in parallel.

At block 612, the example safety analyzer 214 determines whether the dangerous situation has been avoided. That is, the safety analyzer 214 determines that the dangerous situation is no longer present, and the circumstances of the autonomous vehicle 100 have returned to a safe situation. If the dangerous situation has not been avoided (e.g., is still present), control returns to block 608. If the dangerous situation has been avoided (e.g., the vehicle has returned to a safe situation), control advances to block 614 where the example user interface generator 220 renders a representation of the current circumstances of the vehicle 100 with the safety boundary graphic 328 indicating safe circumstances.

At block 616, the example user interface generator 220 determines whether to replay the dangerous situation and/or the associated response. In some examples, the user interface generator 220 makes this determination based on whether one or more thresholds have been satisfied. For example, whether the duration of the dangerous situation exceeds a threshold time period, whether a threshold period of time has elapsed since a previously detected dangerous situation, whether the response of the vehicle includes maneuvers associated with vehicle dynamics that satisfy corresponding thresholds (e.g., sudden braking, sudden acceleration, large deviations in steering the wheels, etc.), etc. If the example user interface generator 220 determines not to replay the dangerous situation and/or the associated response (e.g., the relevant thresholds were not satisfied), control returns to block 602. If the example user interface generator 220 determines to replay the dangerous situation and/or the associated response, control advances to block 618.

At block 618, the example user interface generator 220 selects a temporal window of historical data for the reply. In some examples, the temporal window may include a first threshold period of time before the detection of the dangerous situation and/or extend a second threshold period of time following the end of the dangerous situation. At block 620, the user interface generator 220 renders the replay of the dangerous situation and/or associated response. Thereafter, control returns to block 602. Although the replay is shown and described in FIG. 6 as occurring after a corresponding dangerous situation has been avoided (e.g., has ended), in some examples, the user interface generator 220 may initiate the replay while the dangerous situation is ongoing.

Figure 7:
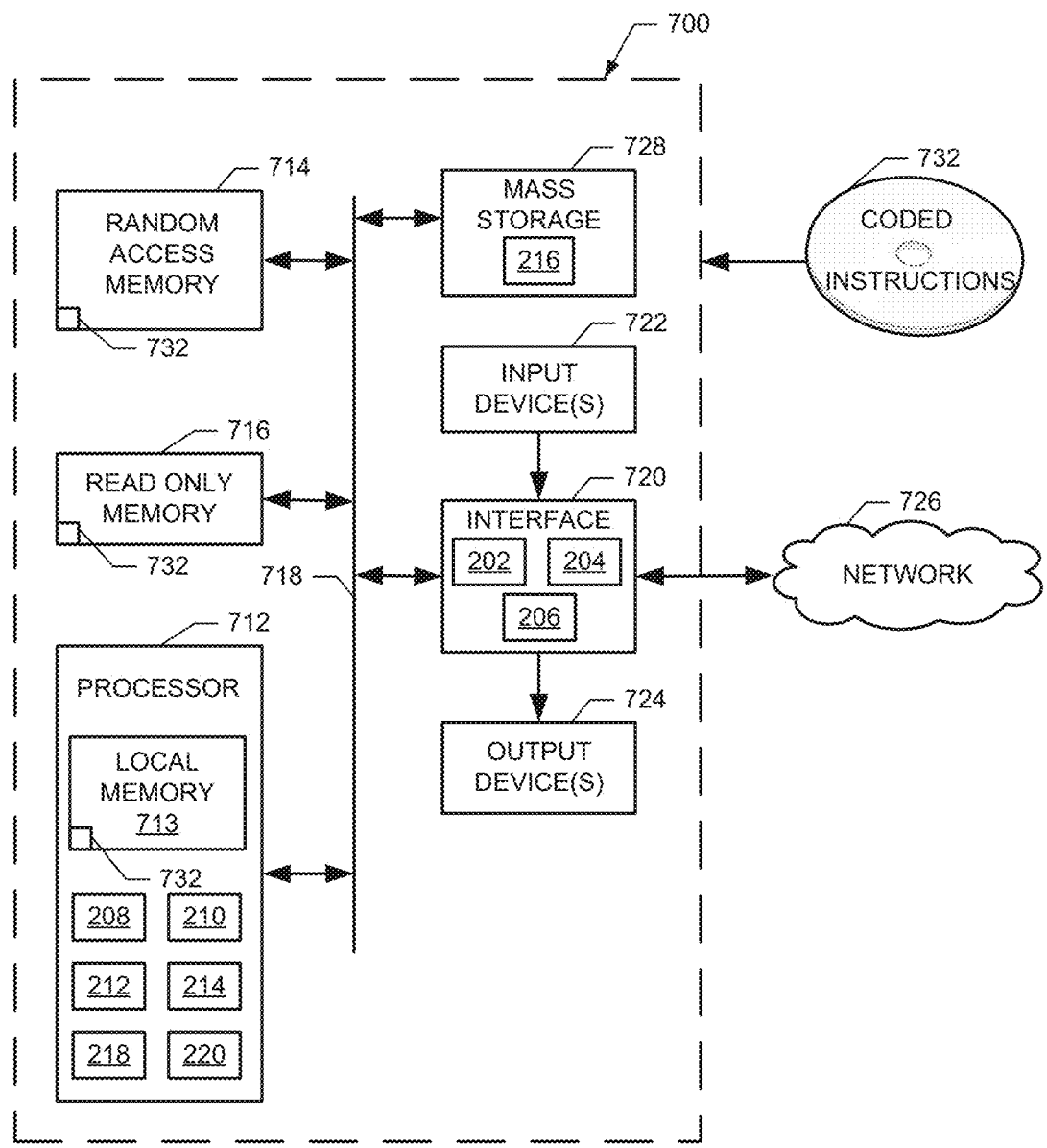
FIG. 7 is a block diagram of an example processing platform structured to execute the instructions of FIG. 6 to implement the example controller of FIGS. 1 and/or 2.

FIG. 7 is a block diagram of an example processor platform 700 structured to execute the instructions of FIG. 6 to implement the controller 102 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example environment analyzer 208, the example navigation analyzer 210, the example vehicle systems analyzer 212, the example safety analyzer 214, the example operations controller 218, and the example user interface generator 220

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In this example, the interface circuit implements the example sensor communications interface 202, the example remote communications interface 204, and the example passenger communications interface 206.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a light camera (still or video), an infrared camera, a radar sensors, a LiDAR sensor, an ultrasonic sensor, an inertial measurement unit, an accelerometer, a gyroscope, a magnetometer, a global positioning system (GPS) sensor, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage devices 728 include the example memory 216.

The machine executable instructions 732 of FIG. 6 may be stored in the mass storage device 728, in the volatile memory 714, in the non-volatile memory 716, and/or on a removable non-transitory computer readable storage medium such as a CD or DVD.

Figure 8:
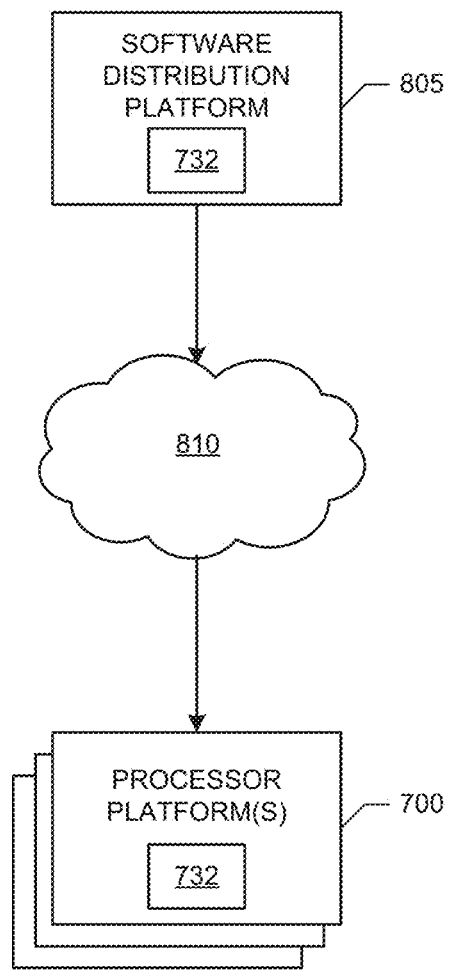
FIG. 8 is a block diagram of an example software distribution platform to distribute software (e.g., software corresponding to the example computer readable instructions of FIG. 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions represented by the flowchart of FIG. 6, as described above. The one or more servers of the example software distribution platform 805 are in communication with a network 810, which may correspond to any one or more of the Internet and/or any of the example networks 108, 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions represented in the flowchart of FIG. 6, may be downloaded to the example processor platform 700, which is to execute the computer readable instructions to implement the example controller 102. In some example, one or more servers of the software distribution platform 805 periodically offer, transmit, and/or force updates to the software (e.g., the example computer readable instructions 732) to ensure improvements, patches, updates, etc. are distributed and applied to the software at the end user devices.

From the foregoing, it will be appreciated that example methods, apparatus and articles of manufacture have been disclosed that enable the control of an autonomous vehicle in a manner that instills increased confidence in passenger(s) of the ability of the vehicle to keep the passenger(s) safe. In particular, examples disclosed herein monitor and detect when the vehicle is in either safe situations or dangerous situations based on an evaluation of mathematically defined safe driving rules included in a safety model. When the vehicle is in a safe situation, such is graphically represented via one or more display screen(s) to the passenger(s). Likewise, when a dangerous situation has been detected, the content rendered on the display screen is updated to indicate the nature of the dangerous situation, thus, demonstrating to the passenger(s) the types of dangers that the vehicle is able to identify. Further, in some examples, the vehicle automatically implements proper response(s) to the dangerous situations until the vehicle is restored to a safe situation. As such response(s) may occur suddenly and without warning to the passenger(s), in some examples, a replay of detected dangerous situation and the corresponding response(s) of the vehicle may be provided to passenger(s) via the display screen to enable the passenger(s) to understand what happened and put their minds at ease as they learn of why the vehicle performed the actions it did.

Example methods, apparatus, systems, and articles of manufacture to provide accident avoidance information to passengers of autonomous vehicles are disclosed herein. Further examples and combinations thereof include the following:

Example 1 includes an apparatus comprising a safety analyzer to determine an autonomously controlled vehicle is in a safe situation at a first point in time and in a dangerous situation at a second point in time, the dangerous situation determined when a deterministically evaluated safe driving rule of a safety model is violated, the safe situation determined when no deterministically evaluated safe driving rule of the safety model is violated, and a user interface generator to generate user interface data to define content for a user interface to be displayed via a screen, the user interface to include a graphical representation of the vehicle, the user interface to graphically indicate the vehicle is in the safe situation at the first point in time, and modify the user interface data so that the user interface graphically indicates the vehicle is in the dangerous situation at the second point in time.

Example 2 includes the apparatus of example 1, wherein the user interface data is to define, at the second point in time, a safety boundary graphic for display in the user interface, the safety boundary graphic to surround the graphical representation of the vehicle, the safety boundary graphic to indicate the dangerous situation.

Example 3 includes the apparatus of example 2, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

Example 4 includes the apparatus of example 2, wherein a first portion of the safety boundary graphic is a first color and a second portion of the safety boundary graphic is a second color, a location of the first portion corresponding to a direction of an object relative to the vehicle that resulted in the determination of the dangerous situation.

Example 5 includes the apparatus of example 4, wherein the user interface data is to define a graphical representation of the object for display in the user interface, the graphical representation of the object positioned relative to the graphical representation of the vehicle based on a relative position of the object to the vehicle in the real world.

Example 6 includes the apparatus of example 5, wherein the graphical representation of the object has a first appearance at the first point in time and a second appearance and the second point in time.

Example 7 includes the apparatus of example 1, wherein the user interface generator is to modify the user interface data in substantially real-time with the determination of the vehicle being in the dangerous situation at the first point in time.

Example 8 includes the apparatus of example 1, further including memory to store data indicative of the dangerous situation and a response implemented by the vehicle to avoid the dangerous situation, the user interface generator to generate the user interface data so that the user interface includes a replay of a graphical representation of the dangerous situation and the response at a third point in time after the second point in time, the replay based on the stored data.

Example 9 includes the apparatus of example 8, wherein the user interface is to display the replay more than once.

Example 10 includes the apparatus of example 1, wherein the user interface data is to define at least one of an audible output, a visual output, or a haptic output to be generated separate from the content displayed on the screen, the at least one of the audible output, the visual output, or the haptic output to be generated when the safety analyzer determines that the vehicle is in the dangerous situation.

Example 11 includes the apparatus of example 1, wherein the screen is integrated into the vehicle.

Example 12 includes the apparatus of example 1, wherein the screen is associated with a portable computing device of a passenger in the vehicle.

Example 13 includes the apparatus of example 1, wherein the screen is remotely located outside of the vehicle.

Example 14 includes a non-transitory computer readable medium comprising instructions that, when executed, cause a machine to at least determine an autonomously controlled vehicle is in a safe situation at a first point in time and in a dangerous situation at a second point in time, the dangerous situation determined when a deterministically evaluated safe driving rule of a safety model is violated, the safe situation determined when no deterministically evaluated safe driving rule of the safety model is violated, and generate user interface data to define content for a user interface to be displayed via a screen, the user interface including a graphical representation of the vehicle, the user interface to graphically indicate the vehicle is in the safe situation at the first point in time, and modify the user interface data so that the user interface graphically indicates the vehicle is in the dangerous situation at the second point in time.

Example 15 includes the non-transitory computer readable medium of example 14, wherein the user interface data is to define, at the second point in time, a safety boundary graphic for display in the user interface, the safety boundary graphic to surround the graphical representation of the vehicle, the safety boundary graphic to indicate the dangerous situation.

Example 16 includes the non-transitory computer readable medium of example 15, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

Example 17 includes the non-transitory computer readable medium of example 15, wherein a first portion of the safety boundary graphic is a first color and a second portion of the safety boundary graphic is a second color, a location of the first portion corresponding to a direction of an object relative to the vehicle that resulted in the determination of the dangerous situation.

Example 18 includes the non-transitory computer readable medium of example 17, wherein the user interface data is to define a graphical representation of the object for display in the user interface, the graphical representation of the object positioned relative to the graphical representation of the vehicle based on a relative position of the object to the vehicle in the real world.

Example 19 includes the non-transitory computer readable medium of example 18, wherein the graphical representation of the object has a first appearance at the first point in time and a second appearance and the second point in time.

Example 20 includes the non-transitory computer readable medium of example 14, wherein the instructions further cause the machine to modify the user interface data in substantially real-time with the determination of the vehicle being in the dangerous situation at the first point in time.

Example 21 includes the non-transitory computer readable medium of example 14, wherein the instructions further cause the machine to store data indicative of the dangerous situation and a response implemented by the vehicle to avoid the dangerous situation, and generate the user interface data so that the user interface includes a replay of a graphical representation of the dangerous situation and the response at a third point in time after the second point in time, the replay based on the stored data.

Example 22 includes the non-transitory computer readable medium of example 21, wherein the user interface is to display the replay more than once.

Example 23 includes the non-transitory computer readable medium of example 14, wherein the user interface data is to define at least one of an audible output, a visual output, or a haptic output to be generated separate from the content displayed on the screen, the at least one of the audible output, the visual output, or the haptic output to be generated in response to the determination that the vehicle is in the dangerous situation.

Example 24 includes a method comprising determining, by executing an instruction with a processor, an autonomously controlled vehicle is in a safe situation at a first point in time and in a dangerous situation at a second point in time, the dangerous situation determined when a deterministically evaluated safe driving rule of a safety model is violated, the safe situation determined when no deterministically evaluated safe driving rule of the safety model is violated, and generating, by executing an instruction with the processor, user interface data to define content for a user interface to be displayed via a screen, the user interface including a graphical representation of the vehicle, the user interface to graphically indicate the vehicle is in the safe situation at the first point in time, and modifying, by executing an instruction with the processor, the user interface data so that the user interface graphically indicates the vehicle is in the dangerous situation at the second point in time.

Example 25 includes the method of example 24, wherein the user interface data is to define, at the second point in time, a safety boundary graphic for display in the user interface to surround, the safety boundary graphic the graphical representation of the vehicle, the safety boundary graphic to indicate the dangerous situation.

Example 26 includes the method of example 25, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

Example 27 includes the method of example 25, wherein a first portion of the safety boundary graphic is a first color and a second portion of the safety boundary graphic is a second color, a location of the first portion corresponding to a direction of an object relative to the vehicle that resulted in the determination of the dangerous situation.

Example 28 includes the method of example 27, wherein the user interface data is to define a graphical representation of the object for display in the user interface, the graphical representation of the object positioned relative to the graphical representation of the vehicle based on a relative position of the object to the vehicle in the real world.

Example 29 includes the method of example 28, wherein the graphical representation of the object has a first appearance at the first point in time and a second appearance and the second point in time.

Example 30 includes the method of example 24, further including modifying the user interface data in substantially real-time with the determination of the vehicle being in the dangerous situation at the first point in time.

Example 31 includes the method of example 24, further including storing data indicative of the dangerous situation and a response implemented by the vehicle to avoid the dangerous situation, and generating the user interface data so that the user interface includes a replay of a graphical representation of the dangerous situation and the response at a third point in time after the second point in time, the replay based on the stored data.

Example 32 includes the method of example 31, wherein the user interface is to display the replay more than once.

Example 33 includes the method of example 24, wherein the user interface data is to define at least one of an audible output, a visual output, or a haptic output to be generated separate from the content displayed on the screen, the at least one of the audible output, the visual output, or the haptic output to be generated in response to the determination that the vehicle is in the dangerous situation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a safety analyzer including circuitry configured to determine an autonomously controlled vehicle is in a safe situation at a first point in time and in a dangerous situation at a second point in time, the dangerous situation determined when an evaluated safe driving rule of a safety model is violated, the safe situation determined when no evaluated safe driving rule of the safety model is violated; and
    a user interface generator including circuitry configured to:
        generate user interface data to define content for a user interface to be displayed via a screen, the user interface to graphically indicate the vehicle is in the safe situation at the first point in time;
        modify the user interface data so that the user interface graphically indicates the vehicle is in the dangerous situation at the second point in time;
        modify the user interface data so that the user interface graphically indicates both (i) a response implemented by the vehicle to avoid the dangerous situation and (ii) an ongoing circumstance of the vehicle after implementation of the response; and
        display a replay of the graphical indication of the vehicle in the dangerous situation at the second point in time and the response implemented by the vehicle, wherein the replay is displayed at a third point in time later than the second point in time.

2. The apparatus of claim 1, wherein the user interface includes a graphical representation of the vehicle, the user interface data to define, at the second point in time, a safety boundary graphic for display in the user interface, the safety boundary graphic to surround the graphical representation of the vehicle, the safety boundary graphic to indicate the dangerous situation.

3. The apparatus of claim 2, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

4. The apparatus of claim 2, wherein a first portion of the safety boundary graphic is a first color and a second portion of the safety boundary graphic is a second color, a location of the first portion corresponding to a direction of an object relative to the vehicle that resulted in the determination of the dangerous situation.

5. The apparatus of claim 4, wherein the user interface data is to define a graphical representation of the object for display in the user interface, the graphical representation of the object positioned relative to the graphical representation of the vehicle based on a relative position of the object to the vehicle in an environment of the vehicle.

6. The apparatus of claim 5, wherein the graphical representation of the object has a first appearance at the first point in time and a second appearance and the second point in time.

7. The apparatus of claim 1, wherein the user interface generator is to modify the user interface data in substantially near real-time with the determination of the vehicle being in the dangerous situation at the first point in time.

8. The apparatus of claim 1, wherein the user interface data is to define at least one of an audible output, a visual output, or a haptic output to be generated separate from the content displayed on the screen, the at least one of the audible output, the visual output, or the haptic output to be generated when the safety analyzer determines that the vehicle is in the dangerous situation.

9. The apparatus of claim 1, wherein the screen is integrated into the vehicle.

10. The apparatus of claim 1, wherein the screen is associated with a portable computing device of a passenger in the vehicle.

11. The apparatus of claim 1, wherein the screen is remotely located outside of the vehicle.

12. A non-transitory computer readable medium comprising instructions that, when executed, cause a machine to at least:
determine an autonomously controlled vehicle is in a safe situation at a first point in time and in a dangerous situation at a second point in time, the dangerous situation determined when an evaluated safe driving rule of a safety model is violated, the safe situation determined when no evaluated safe driving rule of the safety model is violated;
generate user interface data to define content for a user interface to be displayed via a screen, the user interface to graphically indicate the vehicle is in the safe situation at the first point in time;
modify the user interface data so that the user interface graphically indicates the vehicle is in the dangerous situation at the second point in time;
modify the user interface data so that the user interface graphically indicates both (i) a response implemented by the vehicle to avoid the dangerous situation and (ii) an ongoing circumstance of the vehicle after implementation of the response; and
display a replay of the graphical indication of the vehicle in the dangerous situation at the second point in time and the response implemented by the vehicle, wherein the replay is displayed at a third point in time later than the second point in time.

13. The non-transitory computer readable medium of claim 12, wherein the user interface includes a graphical representation of the vehicle, the user interface data to define, at the second point in time, a safety boundary graphic for display in the user interface, the safety boundary graphic to surround the graphical representation of the vehicle, the safety boundary graphic to indicate the dangerous situation.

14. The non-transitory computer readable medium of claim 13, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

15. The non-transitory computer readable medium of claim 13, wherein a first portion of the safety boundary graphic is a first color and a second portion of the safety boundary graphic is a second color, a location of the first portion corresponding to a direction of an object relative to the vehicle that resulted in the determination of the dangerous situation.

16. A method comprising:
determining an autonomously controlled vehicle is in a safe situation at a first point in time and in a dangerous situation at a second point in time, the dangerous situation determined when an evaluated safe driving rule of a safety model is violated, the safe situation determined when no evaluated safe driving rule of the safety model is violated;
generating user interface data to define content for a user interface to be displayed via a screen, the user interface to graphically indicate the vehicle is in the safe situation at the first point in time;
modifying the user interface data so that the user interface graphically indicates the vehicle is in the dangerous situation at the second point in time;
modifying, by executing an instruction with processor circuitry, the user interface data so that the user interface graphically indicates both (i) a response implemented by the vehicle to avoid the dangerous situation and (ii) an ongoing circumstance of the vehicle after implementation of the response; and
displaying a replay of the graphical indication of the vehicle in the dangerous situation at the second point in time and the response implemented by the vehicle, wherein the replay is displayed at a third point in time later than the second point in time.

17. The method of claim 16, wherein the user interface includes a graphical representation of the vehicle, the user interface data to define, at the second point in time, a safety boundary graphic for display in the user interface to surround, the safety boundary graphic the graphical representation of the vehicle, the safety boundary graphic to indicate the dangerous situation.

18. The method of claim 17, wherein the user interface is to include the safety boundary graphic surrounding the graphical representation of the vehicle at the first point in time, the safety boundary graphic to have a first appearance at the first point in time and to have a second appearance at the second point in time, the first appearance to indicate the safe situation and the second appearance to indicate the dangerous situation.

19. The method of claim 17, wherein a first portion of the safety boundary graphic is a first color and a second portion of the safety boundary graphic is a second color, a location of the first portion corresponding to a direction of an object relative to the vehicle that resulted in the determination of the dangerous situation.

20. The method of claim 19, wherein the user interface data is to define a graphical representation of the object for display in the user interface, the graphical representation of the object positioned relative to the graphical representation of the vehicle based on a relative position of the object to the vehicle in the real world an environment of the vehicle.

\* \* \* \* \*